July 9, 1968 C. J. KREMER, JR 3,391,704
VALVE SEAT HAVING GRID-LIKE PATTERN OF SLOT-FORMING RIBS
Filed Dec. 20, 1965
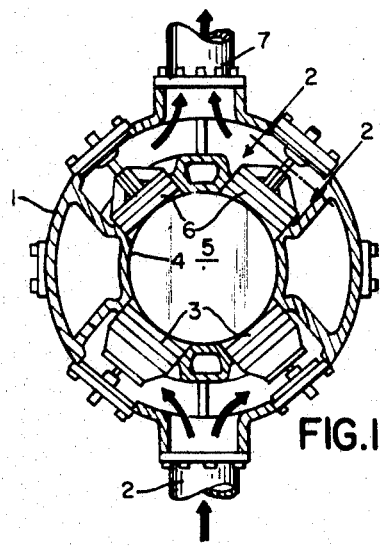
FIG.1
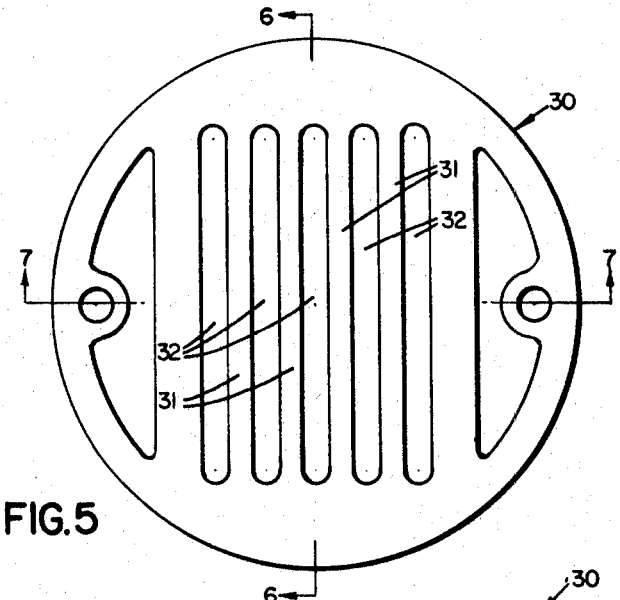
FIG.5
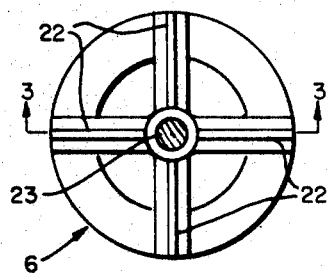
FIG.2
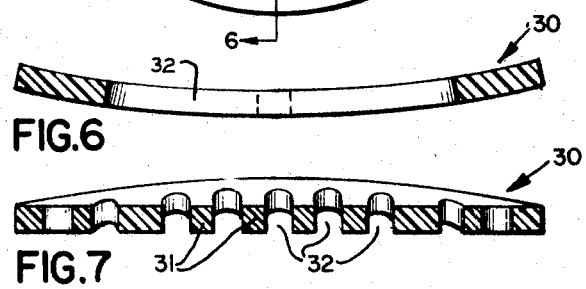
FIG.6
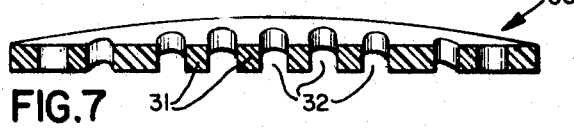
FIG.7
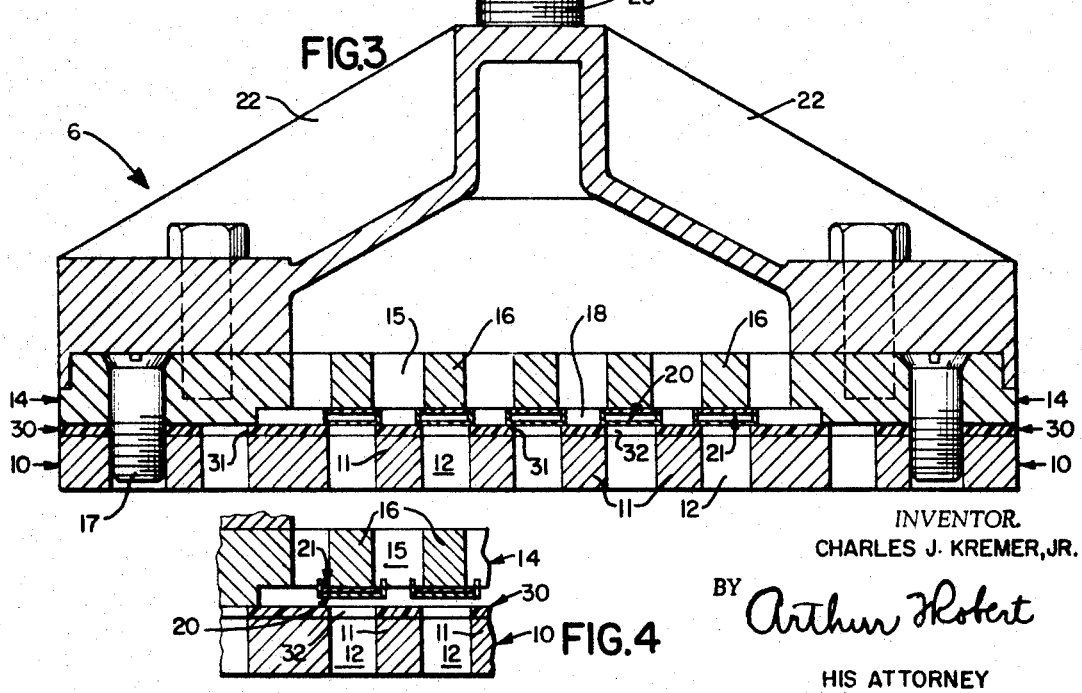
FIG.3
FIG.4
INVENTOR.
CHARLES J. KREMER, JR.
BY Arthur H Robert
HIS ATTORNEY United States Patent Office 3,391,704
Patented July 9, 1968

3,391,704
VALVE SEAT HAVING GRID-LIKE PATTERN OF SLOT-FORMING RIBS
Charles J. Kremer, Jr., Louisville, Ky., assignor to Dover Corporation, Washington, D.C., a corporation of Delaware
Filed Dec. 20, 1965, Ser. No. 515,047
5 Claims. (Cl. 137—512.1)

ABSTRACT OF THE DISCLOSURE

A stationary concavo-convex plate-like valve seat of the slot-and-rib or grid type for use in the outlet valve of compressors, etc. wherein the seat, with its concave face downstream, is flattened into a more or less planar form as it is rigidly secured in its operative position within the valve so that the flattened seat is characterized by an increase in tension along the downstream faces of its ribs and in the resistance of the ribs to gas-flow induced flexure in the downstream direction.

---

This invention relates to valve seats for fluid-flow valves of the type used in compressors, pumps, blowers and the like. More particularly, this invention relates to an improved replaceable valve seat of the plate-like grid-type having, between its oppositely-disposed inlet and outlet faces, a grid-like pattern of gas-flow openings separated by elongate ribs.

Heretofore, it has been customary to construct such replaceable valve seats with flat, more or less planar, inlet and outlet faces. In operation, the force of the gas flow tends to flex the ribs. Repeated flexings eventually result in rib breakage requiring replacement of the valve seat.

A primary object of the present invention is to reduce rib breakage without necessarily increasing the cost of the valve seat.

Another important object of the present invention is to provide a valve seat of the aforesaid grid-type, which has a substantially superior resistance to flexure and to flexure-based failures.

Still another important object of the present invention is to provide a replaceable valve seat of the foregoing plate-like grid-type, which, when mounted in a valve, has stressed ribs which resist flexure.

All of the above objects can be substantially achieved by providing a replaceable plate-like grid-type valve seat, which, when separated from its valve, is of a concavo-convex form and which, when incorporated in its valve, is of flatter preferably planar form. By having the concavo-convex plate-like valve seat curve in the direction of the length of the ribs, the "concave" face of such ribs will be tensioned lengthwise when the seat is operatively flattened and secured in a valve with its flattened "concave" face on the downstream side. When thus tensioned, they are provided with a force or stress opposing the force of the gas flow which tends to flex and break them.

The invention is illustrated in the accompanying drawings, wherein:

FIG. 1 is a transverse cross-section of a reciprocating-piston type of gas compressor having a gas-flow outlet valve which contains a valve seat made in accordance with my invention;

FIGS. 2-4 are views of the gas-flow outlet valve in FIG. 1, which contains my replaceable valve seat, FIG. 2 being a larger-scaled top-plan view taken along line 2—2 of FIG. 1, FIG. 3 a still larger-scaled vertical section taken along line 3—3 of FIG. 2 showing the valve in its closed position and FIG. 4 a fragmentary vertical section corresponding to one taken along line 4—4 of FIG. 2 with the valve open; and FIGS. 5-7 illustrate my presently preferred embodiment of a replaceable valve seat as it appears when removed from its valve, these views being on a smaller diametric scale and a larger thickness scale than FIGS. 3-4, FIG. 5 being a top-plan view of the valve seat, FIG. 6 a vertical cross-section taken longitudinally along line 6—6 of FIG. 5, and FIG. 7 a vertical cross-section taken transversely along line 7—7 of FIG. 5.

FIG. 1

While a valve seat, constructed in accordance with the present invention, may be used in the fluid-flow valves of various devices, including fluid pumps, blowers and the like, my valve seat is herein described and illustrated as a seat for a gas-flow valve, which controls the discharge of gas from a gas compressor of the reciprocating-piston type. This type of gas compressor, as illustrated in FIG. 1, comprises: an outer casing 1; a suction inlet pipe 2; a pair of inlet valves 3; a cylinder 4; a piston 5 in the cylinder; a pair of outlet valves 6; and a compressed gas outlet pipe 7. In operation, the suction stroke of the piston causes gas to flow successively through the suction inlet 2 and both inlet valves 3 into the chamber of the cylinder 4. On the compression stroke, the gas in cylinder 4 is compressed and the compressed gas is forced to flow through both outlet valves 6 into the compressed gas outlet pipe 7.

FIGS. 2-4

The outlet valves 6 are identically constructed. Each outlet valve 6 is conventionally constructed in every respect except for its valve seat which is constructed in accordance with my present invention. When assembled, the valve seat of my invention has the appearance of a conventional valve seat; hence, one outlet valve 6 will be initially described as a conventional structure.

Conventional outlet valve

For the sake of clarity, the outlet valve 6, to be conventionally described, will also be described as it appears in FIG. 3, wherein it is horizontally arranged to valve an upwardly flowing stream of compressed gas.

With this understanding, said outlet valve 6 conventionally comprises: (A) an inner grid-like base plate 10 having a succession of parallel elongate ribs 11 spaced to provide elongate slot-like openings 12 between ribs; (B) an outer grid-like stop plate 14 having a succession of slot-like openings 15 formed by spaced elongate ribs 16; (C) screw means 17 securing the grid-like plates 10 and 14 in opposed face-to-face relationship wherein their central portions cooperate to form a circular vertically-shallow valve chamber 18 between their slotted faces with the stop ribs 16 of the outer stop plate 14 offset from the base ribs 11 of the inner base plate 10 sufficiently to place stop ribs 16 directly opposite the base slots 12; (D) a flat planar grid-like center plate 30 extending across the bottom of said valve chamber 18 *with* its circular margins interposed between and clamped by the margins of the inner and outer plates 10 and 14, *with* its bottom upstream face in face-to-face engagement with the underlying base plate 10, *with* the central portion of its upper downstream face vertically spaced downwardly from the overlying stop plate 14 *and with* its body formed with elongate ribs 31 and slots 32 which respectively correspond to (and are vertically aligned with) the ribs 11 and slots 12 of the base plate; (E) a succession of valve means in the valve chamber 18, one for each valve seat slot 32, each valve means including an upwardly-open channel 20 normally closing its seat slot 32 and an elongate concavo-convex leaf spring 21, arranged between its channel 20 and the overlying stop rib 16 to press its channel 20 resiliently downward into its slot-closing positon; (F) a crab 22 located on the top side of the stop plate 14 and secured thereto; and (G) a threaded stub 23 extending between the center of the crab 22 and the corresponding portion of the outer casing 1 of the compressor for holding the outlet valve 6 as a whole in its operative position.

In operation, using a conventional planar valve seat 30, gas will be sucked into the cylinder during the suction stroke and then compressed and forced out of the cylinder during the compression stroke. More particularly, as the gas is being compressed, its pressure rises. Ultimately, it becomes large enough to force the channel 20 to flex upwardly and thereby open the valve. This places the slots 32 of the valve seat 30 in open communication with the overlying portion of the valve chamber 18. The compressed gas is now free to flow through the valve seat 30, the valve chamber 18 and the slot 15 in the stop plate 14. During this flow, the gas tends to raise the ribs 31 of the valve seat 30 and thereby flex them. Repetitions of this flexing operation ultimately result in rib breakage.

FIGS. 5–7

In accordance with my invention, the valve seat 30 is fabricated in a manner causing its ribs 31 to be stressed longitudinally when it is operatively assembled and secured in a valve. Preferably the ribs of the valve seat 30 are longitudinally tensioned in the direction of their length so as to increase their resistance to gas-flow-induced flexure.

While the invention may be variously accomplished, it may be most simply and easily accomplished by providing a valve seat 30 composed of a resiliently yieldable material which is molded, cast or otherwise formed in a concavo-convex shape such that its upstream face curves convexly and its downstream face curves concavely in the direction of the length of the ribs 31. Thus the valve seat 30 may be composed of a resilient metal or any equivalent material but preferably it is composed of a plastic such as nylon, Teflon or other suitable synthetic resin. With this arrangement, when the valve seat 30 is assembled and secured in place, as in the manner indicated in FIG. 3, it is thereby forced into a flat planar condition causing its ribs to be longitudinally stretched and tensioned, i.e. stretched and tensioned in the direction of their length. In the presently preferred embodiment, my valve seat 30 is operatively assembled and secured with its flattened convex face located on its upstream side so that its ribs tend to flex upstream i.e. in a direction opposite to the direction of gas flow. Obviously, this will inherently stretch the ribs along their downstream faces and compress them along their upstream faces.

The plastic ribs of my valve seat may be both prestressed and mechanically strengthened by molding or casting them about longitudinally stretched filaments of metal, fiberglass or other materials having a high tensile strength so as to embed these stretched filaments permanently in the plastic when it hardens and cause them to stress the ribs permanently in the direction of their length.

It will be appreciated that a valve structure made in accordance with my invention comprises: (A) a rigid upstream-gas-flow plate 10 having a gas-flow-slot 12; (B) means providing a rigid downstream rib 16 spaced from said slot 12; (C) a valve seat 30 secured between said upstream plate 10 and downstream rib 16 to extend adjacent the plate 10 but in spaced relationship to the rib 16 and fashioned to provide a slot-like extension 32 of said upstream slot 12 and a pair of elongate ribs 31, one on each side of said slot-like extension 32, said elongate seat ribs 31 being longitudinally stressed to resist gas-flow-induced flexure; and (D) a yieldable valve (20, 21) arranged between said seat 30 and downstream rib 16 for resiliently closing the opening provided by the slot-like extension 32 of said valve seat 30.

The present invention is primarily suited for use in gas-flow applications; hence, for the sake of clarity, the term gas-flow is used in the specification and claims. But it will be understood that the invention may be used in some liquid-flow applications; hence, the term "gas-flow" is used herein as synonymous with fluid flow.

Having described my invention, I claim:

1. An improved valve seat for gas-flow valves of the grid-type used in compressors, pumps, blowers and the like, wherein, when the valve is open, the pressure of the gas-flow tends to flex the stationary valve seat in the downstream direction and thus move it out of the flat operative position it normally occupies when the valve is closed, comprising:
    (A) a stationary concavo-convex plate-like valve seat of the grid-type having a convex upstream gas-flow face, a concave downstream gas-flow face, and, between faces, a grid-like pattern of gas-flow openings separated by elongate ribs of corresponding concavo-convex form in the direction of their length,
        (1) said seat being adapted to be flattened into a more or less planar form as it is rigidly secured in its operative position within its valve,
        (2) said seat, when flattened, being characterized by an increase in tension along the downstream faces of said elongate ribs and in the resistance of the ribs to gas-flow induced flexure in the downstream direction.

2. The valve seat of claim 1 wherein:
    (A) said seat is comprised of a hardened yieldably resilient plastic material.

3. A gas-flow valve of the type used in compressors, pumps, blowers and the like comprising:
    (A) a rigid upstream gas-flow plate having a gas-flow slot;
    (B) means providing a rigid downstream rib spaced from said slot;
    (C) a valve seat secured between said upstream plate and said downstream rib to extend adjacent the plate in spaced relationship to the rib and fashioned to provide a slot-like extension of said upstream slot and a pair of elongate ribs, one on each side of said slot-like extension,
        (1) said elongate seat ribs being longitudinally stressed to resist gas-flow-induced flexure; and
    (D) a yieldable valve arranged between said seat and downstream rib for resiliently closing the opening provided by said slot-like extension in said valve seat.

4. The gas-flow valve of claim 3, wherein:
    (A) said seat is
        (1) of a concavo-convex form in the direction of the length of said ribs, when said seat is separated from its valve, and
        (2) of a substantially flatter rib-tensioning form when the seat is operatively secured within its valve.

5. The gas flow valve of claim 4, wherein:
    (A) said operatively secured seat has its flattened convex face on its upstream side.

References Cited

UNITED STATES PATENTS 2,941,544 6/1960 Peras _____ 137—517
3,109,451 11/1963 Mihalakis _____ 137—517

WILLIAM F. O'DEA, Primary Examiner.